Feb. 7, 1928.  
F. W. BUTTSCHAU  
HEADLIGHT LENS  
Filed Nov. 29, 1926  
1,658,668

Frederick W. Buttschau  
INVENTOR  
BY Victor J. Evans  
ATTORNEY

WITNESS:

Patented Feb. 7, 1928.

1,658,668

UNITED STATES PATENT OFFICE.

FREDERICK W. BUTTSCHAU, OF TEKOA, WASHINGTON.

HEADLIGHT LENS.

Application filed November 29, 1926. Serial No. 151,463.

This invention relates to a lamp for a motor vehicle or the like, the general object of the invention being to provide an improved lens for the lamp which will prevent glare while enabling the driver of the vehicle to clearly see the road ahead.

Another object of the invention is to provide means for giving a strong white light from the center of the lamp by making the major portion of the lens white and to provide the lens with a rim of ordinary glass so that the rays of light passing through this rim portion will clearly illuminate the road and enable the driver to see curves.

This invention also consists in certain other features of construction and in the combination and arrangement of the several parts, to be hereinafter fully described, illustrated in the accompanying drawings and specifically pointed out in the appended claim.

In describing my invention in detail, refernce will be had to the accompanying drawings wherein like characters denote like or corresponding parts throughout the several views, and in which:—

Figure 1:
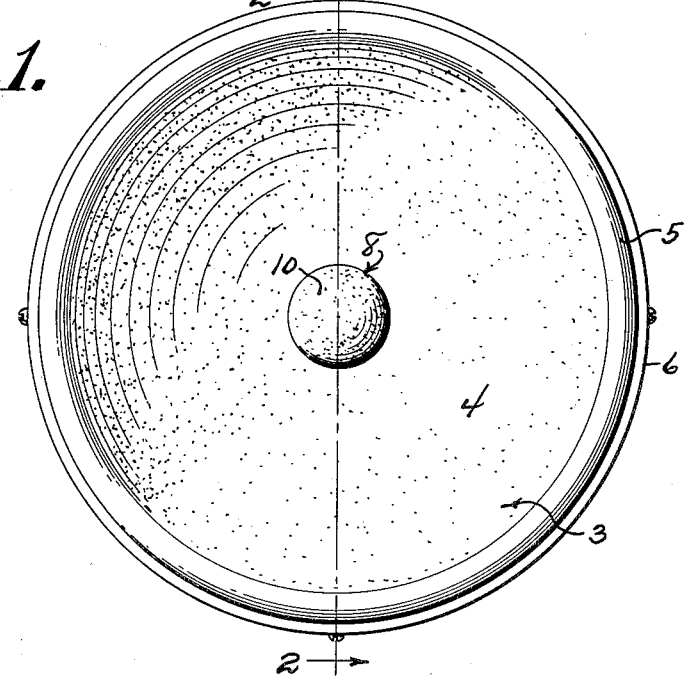
Figure 1 is a front view of the improved lamp.
Figure 2:
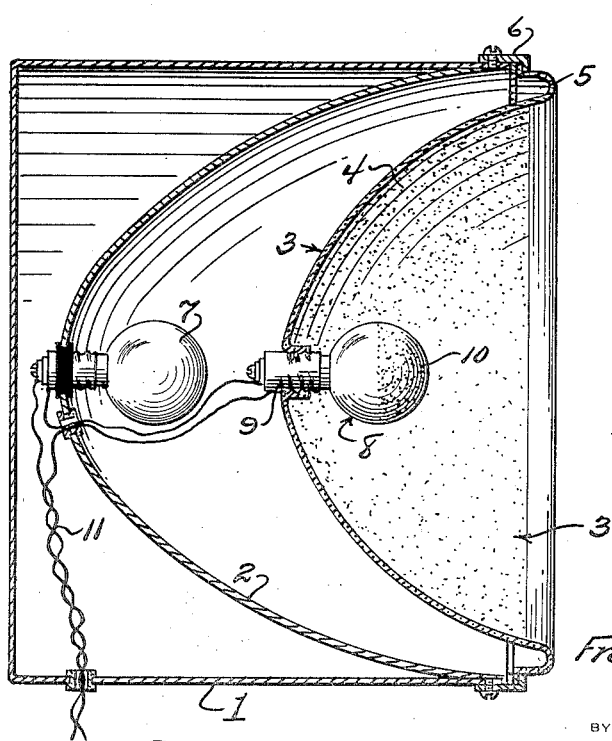
Figure 2 is a section on line 2—2 of Figure 1.

In these views, 1 indicates the casing of the lamp and 2 the reflector thereof, these parts being of the ordinary or any desired construction. 3 indicates the lens which has its major central portion of concavo-convex shape, as shown at 4, and with a rim portion 5 which is of curved construction to provide an annular rib around the portion 4, the rib being of substantially U-shape in cross section, as shown. This rib portion is of clear glass while the portion 4 is of white glass. The outer edge of the rib portion is fastened to the casing by the clamping means 6 which also hold the reflector in place. The usual lamp 7 is carried by the reflector and the rays of this lamp are deflected by the lens 3 so that they will pass through the rib 5, though some of the rays from this lamp will pass through the lens. A lamp 8 is carried by the socket 9 which is placed at the center of the lens 3 and the outer half of this lamp is also colored white, as shown at 10. The two lamps are placed in the same circuit, as shown by the conductors 11.

It will thus be seen that the device will give an brilliant white light which is surrounded by the ordinary light rays passing through the clear rib portion so that the road will be fully illuminated without producing a glare to interfere with the drivers of other cars or pedestrians approaching the car with the improved device thereon. The rib part also acts to throw the light so that the driver can see where he is going on a curve as well as on straight portions of the road.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A lamp of the class described comprising a casing, a reflector therein, a lens at the front of the lamp having a central portion of semi-spherical shape with an annular rib of curved shape in cross section, said rib being of clear glass and the semi-spherical portion being of white glass, a lamp carried by the reflector and a lamp carried by the central part of the lens and having its outer half white.

In testimony whereof I affix my signature.

FREDERICK W. BUTTSCHAU.